(12) United States Patent
DuPont et al.

(10) Patent No.: US 12,306,318 B2
(45) Date of Patent: May 20, 2025

(54) CENTER PATH ESTIMATOR FOR AGRICULTURAL WINDROWS

(71) Applicant: Southwest Research Institute, San Antonio, TX (US)

(72) Inventors: Edmond DuPont, San Antonio, TX (US); Prasanna R Kolar, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 239 days.

(21) Appl. No.: 17/856,326

(22) Filed: Jul. 1, 2022

(65) Prior Publication Data
US 2024/0004087 A1 Jan. 4, 2024

(51) Int. Cl.
| | |
|---|---|
| G01S 19/45 | (2010.01) |
| A01B 69/04 | (2006.01) |
| A01F 15/07 | (2006.01) |
| G01B 11/22 | (2006.01) |
| G06T 7/593 | (2017.01) |
| G06V 10/82 | (2022.01) |
| G06V 20/56 | (2022.01) |
| G06V 20/70 | (2022.01) |
| H04N 13/239 | (2018.01) |
| H04N 23/667 | (2023.01) |

(52) U.S. Cl.
CPC .............. *G01S 19/45* (2013.01); *G01B 11/22* (2013.01); *G06T 7/593* (2017.01); *G06V 10/82* (2022.01); *G06V 20/56* (2022.01); *G06V 20/70* (2022.01); *H04N 13/239* (2018.05); *A01B 69/008* (2013.01); *A01F 15/07* (2013.01); *G06T 2207/10012* (2013.01); *G06T 2207/10024* (2013.01); *G06T 2207/10028* (2013.01); *G06T 2207/10152* (2013.01); *H04N 23/667* (2023.01)

(58) Field of Classification Search
None
See application file for complete search history.

(56) References Cited

U.S. PATENT DOCUMENTS

| | | | | |
|---|---|---|---|---|
| 2001/0028510 A1* | 10/2001 | Ramm | ....................... | G06T 7/75 359/663 |
| 2006/0178820 A1* | 8/2006 | Eglington | ............ | A01B 69/008 701/50 |
| 2010/0245585 A1* | 9/2010 | Fisher | ................... | G06F 1/1686 348/240.99 |

(Continued)

OTHER PUBLICATIONS

Yili Gu, Path Tracking Control of Field Information-Collecting Robot Based on Improved Convolutional Neural Network Algorithm, 2020 (Year: 2020).*

*Primary Examiner* — Christian Chace
*Assistant Examiner* — Shayne M. Gilbertson
(74) *Attorney, Agent, or Firm* — Livingston Law Firm

(57) ABSTRACT

A windrow path detector for use by baling equipment. A camera system is mounted on the baling equipment and provides image data representing a stereo view of a windrow ahead of the baling equipment. A pre-processor to generates a depth image. A neural network receives the depth image and the image data from at least one camera, and is trained to use that input to generate a predicted center line over the windrow. A center path process uses the predicted center line to define a navigation path, which it delivers to a navigation system on-board the baling equipment.

6 Claims, 3 Drawing Sheets

(56) References Cited

U.S. PATENT DOCUMENTS

| | | | |
|---|---|---|---|
| 2017/0193338 A1* | 7/2017 | Huberman | G06V 10/82 |
| 2017/0263192 A1* | 9/2017 | Luna | G09G 5/003 |
| 2022/0215603 A1* | 7/2022 | Goldman | B60W 30/18009 |
| 2023/0376041 A1* | 11/2023 | Childs | G05D 1/0223 |
| 2024/0053163 A1* | 2/2024 | Shtok | G01C 21/365 |

* cited by examiner

CENTER PATH ESTIMATOR FOR AGRICULTURAL WINDROWS

TECHNICAL FIELD OF THE INVENTION

This patent application relates to automated processes for the agricultural industry, and more particularly to estimating center paths over windrows for baling equipment.

BACKGROUND OF THE INVENTION

An important process in agriculture is the generation of hay bales for feeding animals. Bale production involves the use of various machines, such as tractors, tedders, rakers, and balers. As part of the baling process, recently cut forage material is placed in windrows. Windrows are raked rows of forage that are allowed to dry prior to bale collection. A hay baler drives over these windrows for easy collection into bales.

Traditionally, a hay baler is an implement that is attached on the back of a tractor to generate bales of a specific shape. Forage may be baled as "round" or "square" bales in a variety of sizes.

Proper navigation over a windrow is essential to efficient processing of the windrow material. Windrows are not always regular and well formed. Irregular windrows can result in blockages or loss of performance if not properly navigated.

Manufacturers of forage agricultural equipment have developed semi-automated but operator driven hay balers for round bales. The automated baling platform allows the driver to navigate windrows while quickly and easily creating bales. More advanced automated balers will move towards full autonomy requiring automatic steering control over windrows.

A challenge in automated baling operations is that the baler should function in contrasting lighting conditions such as during the day in the presence of casting shadows. Current approaches use single plane lidars to measure the cross-section of the windrow at a distance in front of the vehicle. While the lidar approach works under various lighting conditions, it only observes measurements at this cross-section and not along the length of the windrow.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a hay baling control system that provides hay baling equipment with a navigation path along the full length of a windrow. The control system allows the baler to operate under various lighting conditions, such as daylight with shadows and low light. It provides a smooth, accurate path over the center of the windrow for simplifying baling in day or low-light scenarios.

The control system uses a range imaging camera system and special processing to estimate the center path along the windrow. It interfaces with the navigation control system of an automated baler.

Figure 1:
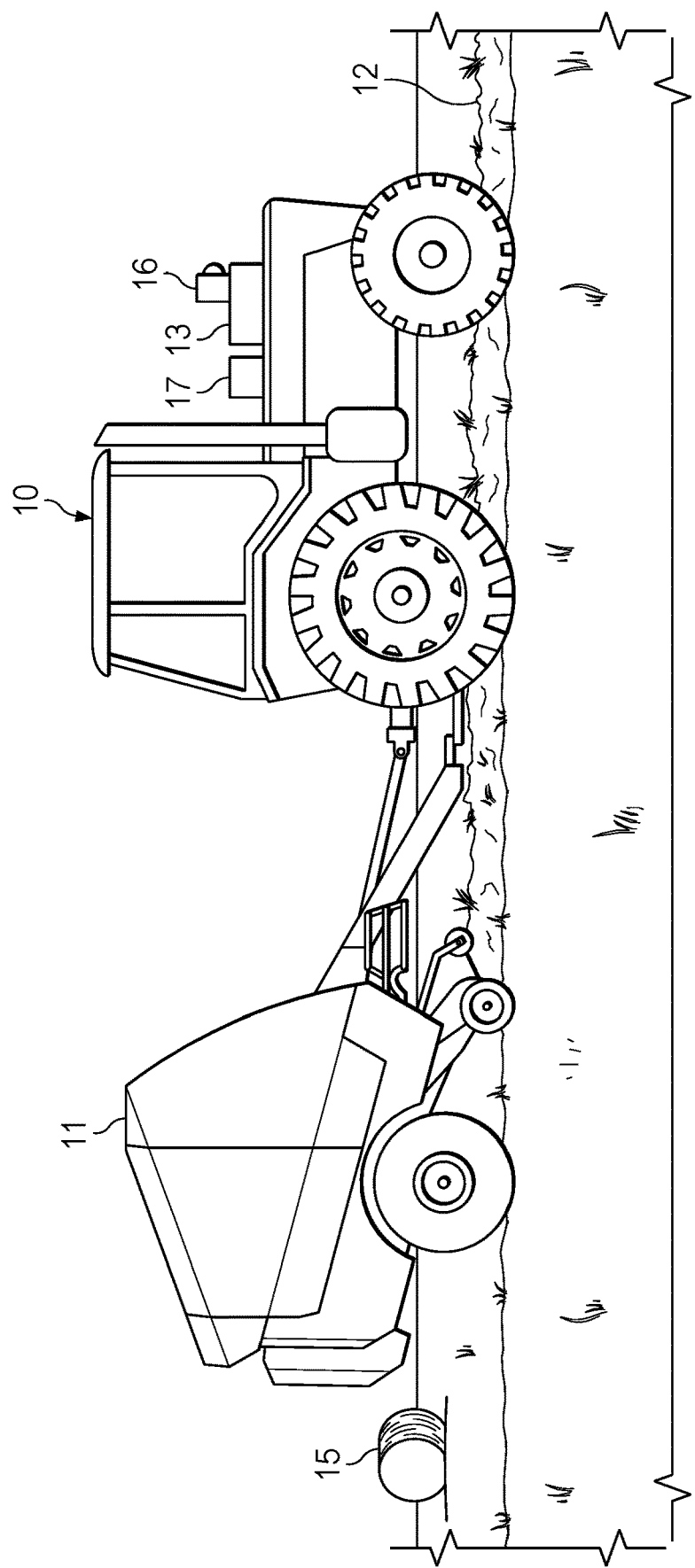
FIG. 1 illustrates baling equipment having a windrow path control system in accordance with the invention.

FIG. 1 illustrates a tractor 10 pulling a hay baler 11 over a windrow 12 and having a control system 13 in accordance with the invention. Control system 13 may be implemented with an on-board computer programmed to perform the tasks described herein.

In the illustration, baler 11 produces round hay bales such as hay bale 15, but the invention applies to control systems for balers for any size or shape of bale.

In the example of this description, tractor 10 pulls the baler 11 as an attachment and is designed to accommodate a human operator. However, it is expected that the control system described herein may make possible an integrated tractor/baler system that is fully autonomous. Thus, for purposes of this description, a "baler" may be any equipment used for driving over windrows to produce hay in bales, whether as an attachment or as a self-propelled piece of equipment and whether its operation is autonomous or human-assisted.

It is assumed, however, that the tractor or other equipment has a navigation system 17, which receives path data from control system 13 to direct its travel over the center of the windrow. This navigation system 17 may be a GPS (global positioning system) system, or any other system designed to control the direction of travel of the tractor.

In FIG. 1, the windrow is hay or other silage material for baling. However, more generally, a "windrow" may be any elongated mound of material on the ground destined for pickup or processing by equipment that drives over its length. As another example, farmers commonly use compostable windrows to produce compost. Driving "over" or "along" a windrow as used herein means driving over the center of the windrow length.

In general, control system 13 is suitable for use with any equipment that performs operations on classifiable elongated mounds such as within crop rows, vineyard rows, dairy yards, industrial aisles, and construction berms that maintain operations that require path estimates under low light conditions. By "classifiable" is meant that the mound can be detected and recognized by adaptive machine learning techniques such as are described below.

A camera system 16 is mounted on the tractor 10 such that its field of view includes a windrow ahead of the tractor's direction of travel. Camera system 16 comprises two or more back-illuminated pixel cameras, which handle high-contrast and low-light conditions. In one embodiment, two synchronized coplanar cameras have image sensors capable of daytime and low light operations. Suitable image sensors are those that produce high contrasting images during day as well as low-light conditions. Although in the embodiment of this description, the imaging sensors are stereo cameras, other range imaging systems such as time of flight cameras or registered cameras and multiplane lidars could be used.

Camera system 16 provides pixel image data to control system 21, which processes the image data to provide a center path for the vehicle to travel over the windrow. This center path is delivered to the vehicle's navigation system 17 so that the vehicle can be directed to follow the correct path.

Figure 2:
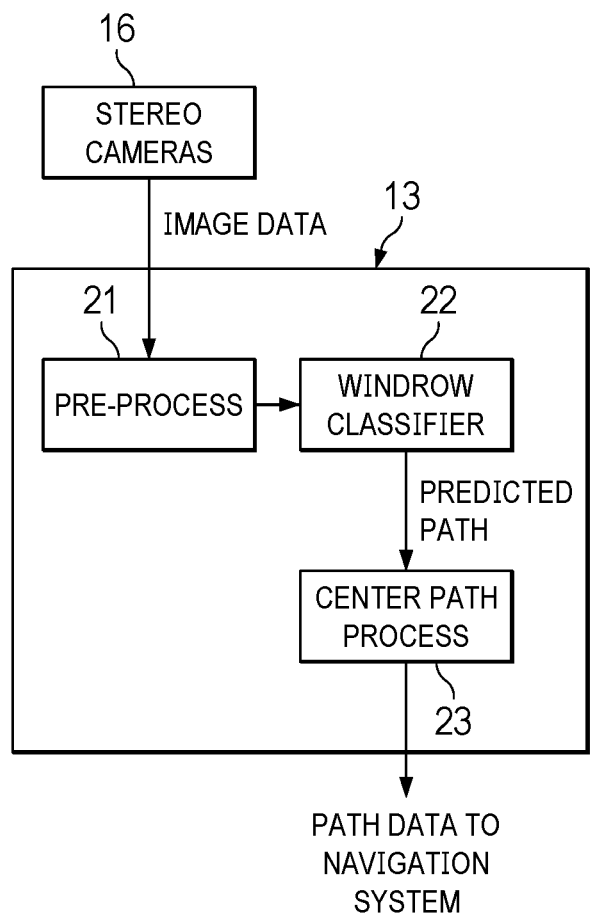
FIG. 2 illustrates the control system of FIG. 1 in further detail.

FIG. 2 illustrates the control system of FIG. 1 in further detail. For real time path detection, the image data from camera system 16 is delivered to pre-processor 21. The image data comprises a set of calibrated images (left and right cameras). Pre-processor 21 pre-processes the image data from the two camera images, using a disparity algorithm to generate a disparity image. This disparity image represents the correlation of pixels between the left and right images and may also be referred to as a "depth image". The depth is the range at each pixel using two camera triangulations.

After pre-processing, color image data from one camera and the depth image data are delivered to neural network classifier 22, trained to detect windrows and to recognize a center path. Classifier 22 is trained as explained below. After training classifier 22, classifier 22 is made part of control system 13 for running in real-time.

The output of classifier 22 is a labeled image of the predicted center line of the windrow, with neighboring pixels of various confidence values.

A center path process 23 refines the labeled data output of classifier 22 to define an improved navigation path. A spline fit is applied to the high confidence labels to define the navigation path along the windrow within the image pixels. Using the camera's calibration geometry and the depth image, the path is converted from image pixels into three-dimensional points relative to the cameras and projected onto the ground surface.

The resulting path data is easily interfaced with an automated navigation system over communication mediums, such as Controller Area Network (CAN) bus, Ethernet, etc.

Windrow Classifier Training

For training classifier 22, a test area comprises cut and dried grass or hay formed into windrows of various forms and sizes, including straight and curved rows as well as malformed rows with gaps, for collection of data. The data is collected during daytime and under low-light conditions to build a diverse dataset of the windrows.

Camera system 21 is mounted on a vehicle having global localization capabilities, such as GPS, to record the path driven by the vehicle. This path is processed to define a ground truth windrow spline within a dataset. This technique reduces or eliminates manual data collection and labeling efforts, allowing sufficient training data to be collected and labeled. The collected localization data provides both training data and benchmark data for the perception and navigation algorithms.

The data is processed to define the ground truth labels along the windrow within the color image and depth image. Some frames are removed to filter objects, such as existing bales, which may obstruct with the windrow. This processing provides a clean dataset that can be further processed for the existence of windrows. After a robust database is generated, the data is encoded for input to the neural network.

The color and depth data undergoes an affine transformation or three-dimensional projection to generate an overhead perspective that is correlated with the localization data with respect to the vehicle. In other words, for each perspective view, an overlay is made with the localization path. This overlays the GPS (localization) points over the center of the windrow. The result is labeled data for training the neural network.

In this manner, the training data has ground truth image annotations of the localization path along the windrow whose pixel values correspond with the depth from the range imaging cameras. This transformation allows further processing of the image and localization information to take place as unified data instead of separate streams. The formatted data is presented to the neural network to train with this ground truth dataset.

A semantic segmentation based neural network is applied to the dataset to train a model of the windrow given the generated data input and ground truth annotations. The neural network applies sematic segmentation and considers the significance of spatial information, global context information, and boundary details to estimate the center of the classified windrow.

Figure 3:
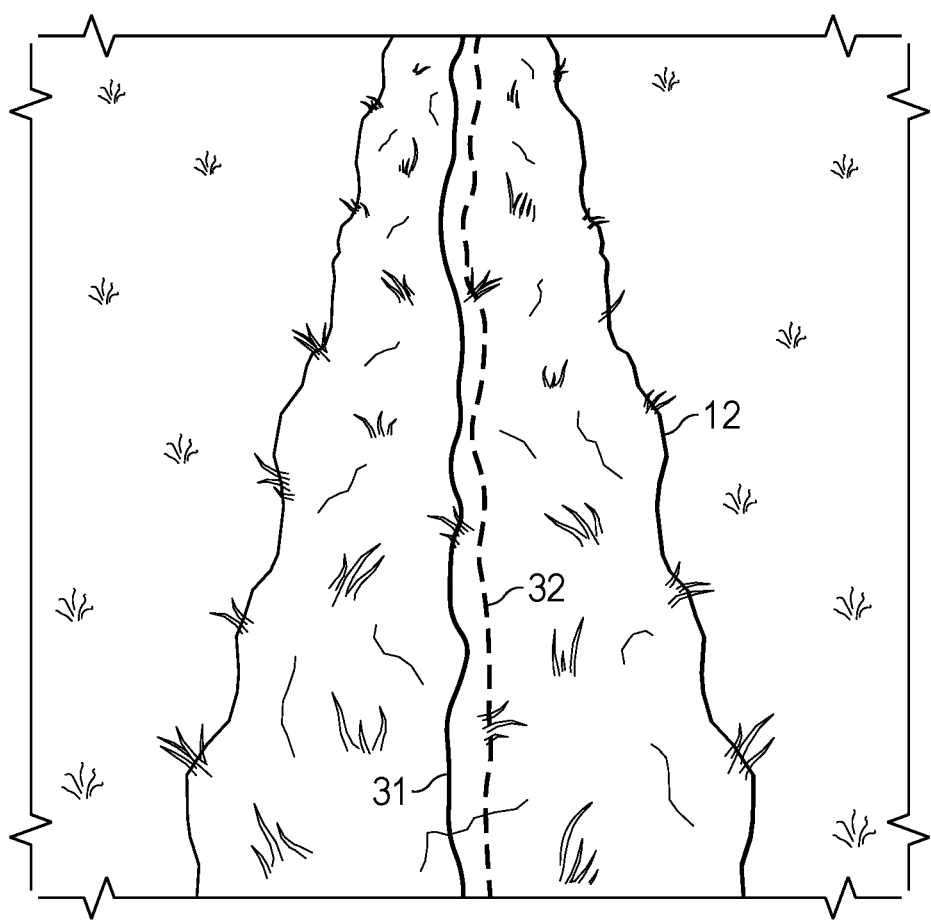
FIG. 3 illustrates a portion of the process of training the neural network of the control system.

FIG. 3 illustrates the spline fitting of the training process. During the manually driven ground truth localization, the training system records pose estimates that can be connected to form a path. This model estimates the center of the windrow to which cubic spline fit is applied. Line 31 is the manually driven ground truth, which is created by naively connecting the pose estimates in order. Line 32 is the spline that is created as the output of the neural network. The root-mean-squared error between these lines should be within a pre-defined threshold for every N-meter section to be considered as a valid estimate of the windrow center.

What is claimed is:

1. A windrow path detector for use by baling equipment, the baling equipment being equipped with a navigation system, comprising:
    a camera system mounted on the baling equipment and having at least two spaced cameras, the cameras operable to provide image data representing a stereo view of a windrow ahead of the baling equipment;
    an image data pre-processor operable to receive the image data from each camera and to generate a depth image;
    a neural network operable to receive input data comprising a single data stream based on driven paths over test windrows localized with a global localization system to create a ground truth windrow spline, correlated with an overhead perspective based on color image data and depth image data, the neural network being trained to use the input data to classify the test windrows and to generate a predicted center line over the test windrows; and
    a center path process operable to use the predicted center line to define a navigation path, using a spline fit and converting pixels into three-dimensional points relative to the cameras and projected onto the ground surface;
    the center path process further operable to deliver the navigation path to the navigation system.

2. The windrow path detector of claim 1, wherein the camera system comprises back-illuminated pixel cameras.

3. The windrow path detector of claim 1, wherein the camera system is operable in daylight and low-light conditions.

4. The windrow path detector of claim 1, wherein the windrow is silage material.

5. The windrow path detector of claim 1, wherein the windrow is compost material.

6. The windrow path detector of claim 1, wherein the navigation system is a GPS (global positioning system) navigation system.

* * * * *